United States Patent
Shih

(10) Patent No.: US 7,739,429 B2
(45) Date of Patent: Jun. 15, 2010

(54) METHOD FOR DATA PROCESSING DEVICE EXCHANGING DATA WITH COMPUTER

(75) Inventor: Hsuan-ming Shih, Taiwan Province (CN)

(73) Assignee: Taiguen Technology (Shen_Zhen) Co., Ltd., Taoyuan Hsien (TW)

( * ) Notice: Subject to any disclaimer, the term of this patent is extended or adjusted under 35 U.S.C. 154(b) by 216 days.

(21) Appl. No.: 10/564,150

(22) PCT Filed: Mar. 10, 2005

(86) PCT No.: PCT/CN2005/000294

§ 371 (c)(1),
(2), (4) Date: Jan. 11, 2006

(87) PCT Pub. No.: WO2005/086002

PCT Pub. Date: Sep. 15, 2005

(65) Prior Publication Data

US 2006/0200493 A1   Sep. 7, 2006

(30) Foreign Application Priority Data

Mar. 10, 2004   (CN) .................. 2004 1 0008437

(51) Int. Cl.
*G06F 13/12* (2006.01)
*G06F 9/00* (2006.01)

(52) U.S. Cl. ............................ 710/62; 710/15; 710/19; 370/338; 713/2

(58) Field of Classification Search ............... 713/2; 710/62, 15, 19; 370/338; 707/104.1
See application file for complete search history.

(56) References Cited

U.S. PATENT DOCUMENTS 5,655,148 A * 8/1997 Richman et al. ............. 710/8
5,675,831 A * 10/1997 Caputo ....................... 710/10
7,237,046 B2 * 6/2007 Paley et al. ................ 710/38

(Continued)

FOREIGN PATENT DOCUMENTS

CN           1341942 A1    3/2002

(Continued)

*Primary Examiner*—Henry W. H. Tsai
*Assistant Examiner*—Steven G Snyder
(74) *Attorney, Agent, or Firm*—J.C. Patents

(57) ABSTRACT

The invention relates to a method for data processing device exchanging data with computer, including: a computer sends a enquiring message of the device's type to the data processing device; after receiving the message, the control module sends the information about the device's type of the data processing device, informs the computer that the data processing device is the device with auto-run function or is the device without auto-run function; if the device's type information indicates that the data processing device is the device with auto-run function, then the device attribute of the data processing device's is set to the device with auto-run function, and the data processing device is accessed according to the corresponding access specifications, if there is the auto-running file in the data processing device, then the auto-run function is performed according to the script in the auto-running file, else the operation on the data processing device is finished, or else the device attribute of the data processing device is set to the device without auto-run function; by using the invention it can realize the data processing device automatically exchanging data with computer, and the exchanged data can be defined by user.

7 Claims, 5 Drawing Sheets

U.S. PATENT DOCUMENTS

| | | |
|---|---|---|
| 2002/0083228 A1* | 6/2002 | Chiloyan et al. ............... 710/9 |
| 2002/0161939 A1* | 10/2002 | Kim et al. ..................... 710/8 |
| 2003/0005278 A1* | 1/2003 | Deng et al. ................... 713/2 |
| 2003/0131173 A1* | 7/2003 | Cassidy ..................... 710/308 |
| 2004/0125782 A1* | 7/2004 | Chang ........................ 370/338 |
| 2004/0172427 A1* | 9/2004 | Thomas et al. ............. 707/204 |
| 2004/0172526 A1* | 9/2004 | Tann et al. ................... 713/2 |
| 2006/0117170 A1* | 6/2006 | Cheng ......................... 713/2 |
| 2007/0106823 A1* | 5/2007 | Yang et al. ................... 710/15 |

FOREIGN PATENT DOCUMENTS

| | | |
|---|---|---|
| CN | 1343917 A1 | 4/2002 |
| CN | 1570881 A1 | 1/2005 |
| EP | 1 443 407 A1 | 8/2004 |
| JP | 2003114799 A * | 4/2003 |
| JP | 2004213427 A * | 7/2004 |
| WO | WO 02080176 A2 * | 10/2002 |

* cited by examiner

METHOD FOR DATA PROCESSING DEVICE EXCHANGING DATA WITH COMPUTER

FIELD OF THE INVENTION

The invention relates to a method for data processing device exchanging data with computer, in particular, to a method for data processing device with standard data interface exchanging data with computer.

BACKGROUND OF THE INVENTION

In general cases, after connecting with a computer, a data processing device will exchange data with the computer. There are different processes of data exchanging depending on whether the data processing device is plug_and_play or not.

If the data processing device is plug_and_play, the process of data exchanging is as following: The operation system of the computer auto-checks whether there is plug_and_play device during the system start, if a new device is found and there's a *.inf file of such kind device in the direction INF of the operating system (INF is the abbreviation of Device INFormation File, and is one kind of file format provided for the manufacturer of hardware device publishing his driver program. The INF file includes the information of hardware device or script to control operation of hardware. The INF file specifies how to install the hardware driver into the system, where the initializing file is, to which folder installed is and how to add self-corresponding information into register and so on. Monitor, modem, printer and some like these kinds of devices are through INF file to install.) of the operation system, then the computer auto-installs driver program, else the computer will start the hardware guide to prompt user to select or search driver program of the device, i.e. the corresponding *.inf file, then the hardware guide will copy the specified file to corresponding direction according to the content of the *.inf file, and write corresponding information to register to finish installing of the driver program of the device. After finishing installation, setting the attribute of the device is necessary. For example, before using a network card, the network protocol must be installed and set; before using modem to access network, "new connection" must be built firstly, and so on. And then the operation system of the computer starts to exchange data with the device. The user manually starts corresponding application program or perform operation of the device and exchange data with the computer to realize the fixed function.

If the data processing device is not plug_and_play, the process of data exchanging is as following: The operation system of the computer can not auto-check the device during the system start and the user need to start the hardware guide for installation directly and manually. If there's not the corresponding *.inf file in the direction INF, the computer will start the hardware guide to prompt user to select or search driver program of the device, i.e. the *.inf file. The hardware guide will copy the specified file to corresponding direction according to the content of the *.inf file and write corresponding information to register to finish installing of the driver program of the device. After finishing installation, the attribute of the device is set. For example, before using a network card, the network protocol must be installed and set; before using modem to access network, "new connection" must be built firstly, and so on. And then the computer starts to exchange data with the device. The user manually starts corresponding application program or perform operation of the device and exchange data with the computer to realize the fixed function.

In the prior art, some problems existed in the method for data processing device exchanging data with computer: 1) If the driver program of some kind data processing device have not be embedded in the operation system, then the user must manually install the driver program of the device and the process of the operation is complicated. 2) Although the standard driver program of some kind data processing device has been installed in the operation system, but if the user need to use the substandard driver program of the device, then the user also must manually install the substandard driver program. 3) After finishing installing the driver program of data processing device, the user also demands to set relational device parameters of some special devices to make the normal use of the devices. This also causes the complicated process of operation. 4) When using the data processing device to attain definite application function, the user must start relative application manually. This also causes the discommodious operation. 5) It's unable to achieve as expected that some software stored can be executed directly when data processing device is connected to the computer according to the method of prior art.

SUMMARY OF THE INVENTION

The technical problem to be solved by the present invention is to provide a method for data processing device with standard data interface exchanging data with computer. The data processing device may automatically exchange definable data with computer to attain the fixed functions without user's interference.

A method for data processing device exchanging data with computer, said data processing device includes standard data interface, control module and storage module; the standard data interface used for the data processing device connecting with the computer, and the control module used for W/R controlling to storage module and exchanging data with the computer; when said data processing device is connected with the computer under the running-state through the standard data interface or when the operation system of the computer connected with said data processing device starts, said computer communicating with the control module based on said standard data interface, and carries on the steps of:

step 1, said computer sending an enquiring message of the device's type to said data processing device;

step 2, after receiving the enquiring message of the device's type, said control module sending a device's type information of said data processing device to the computer, and informing the computer that the data processing device is the device with auto-run function or without auto-run function;

step 3, after said computer receiving said device's type information, if the device's type information indicating that the data processing device is the device with auto-run function, then the computer correspondingly setting the device attribute of the data processing device, and accessing said data processing device according to the corresponding access specifications, then carrying on step 4, else carrying on step 5;

step 4, if the computer finding the auto-running file stored in the data processing device, then the computer performing auto-run function according to the script in the auto-running file, else the operation on the data processing device being finished until next access operation to said data processing device;

step 5, said computer setting the device attribute of said data processing device to the device without auto-run function, finishing the operation on the data processing device until next access operation to said data processing device.

Sometimes, users don't expect that the computer auto-runs the programs stored in the data processing device, therefore two approaches are provided as following:

One approach is that a control switch is set in the data processing device for controlling the start or stop of auto-run function of said data processing device; on this basis, after receiving the enquiring message of the device's type, the control module checks whether the state of said control switch is representing the start of auto-run function or not, if "yes", then the control module responds the device's type message to the computer and informs the computer that the data processing device is the device with auto-run function, else responds the device's type message to the computer and informs the computer that the data processing device is the device without auto-run function.

Another approach is that a control data is stored in the storage module for representing the start or stop of auto-run function of said data processing device; after receiving the enquiring message of the device's type, the control module firstly accesses said control data, and discriminates whether the data is represented to control the data processing device being the start of the auto-run function; if "yes", then the control module responds the device's type message to the computer and informs the computer that the data processing device is the device with auto-run function, else informs the computer that the data processing device is the device without auto-run function.

Over here so-called auto-running represents that the computer accesses the programs to be run by the script and executes them in the order specified in the auto-running file according to the script in the auto-running file. The program may be stored in the storage module of the data processing device or stored in the other storage devices of the computer. Such setting is greatly flexible.

A secure storage area is set in the storage module and is set that the secure storage can not be displayed and/or modified by the computer for securing the auto-running file and program i.e., these auto-running files and program not being deleted or being modified unexpectedly. The auto-running file and/or program may be stored in the secure storage area. In addition, one or a plurality of data storage areas are setup in the storage module for storing configuration information and/or data to be exchanged, and storing the configuration information about the data storage areas; therefore said step 5 further comprises: the computer communicating with the data processing device, parsing said stored configuration information and exchanging data with the computer in accordance with the configuration information.

The standard interface of the data processing device of the present invention may be USB interface or IEEE1394 interface which is widely used now so that the program expected running by the user runs automatically as soon as the data processing device connects with the computer.

For the present invention, the device with auto-run function may be CD driver in accordance with the present specification for CD driver.

Moreover, the device without auto-run function may be floppy disk, hard disk or flash-based storage device such these computer peripheral devices.

Using the present invention can achieve the data processing device automatically exchanging data with the operation system, and the exchanged data can be defined by the user. Therefore, the deficiency of the prior art, complicated operation, can be solved.

DETAILED DESCRIPTION OF THE PREFERRED EMBODIMENTS

The present invention will be described in details with reference to the accompanying drawings and the preferred embodiments.

Figure 1:
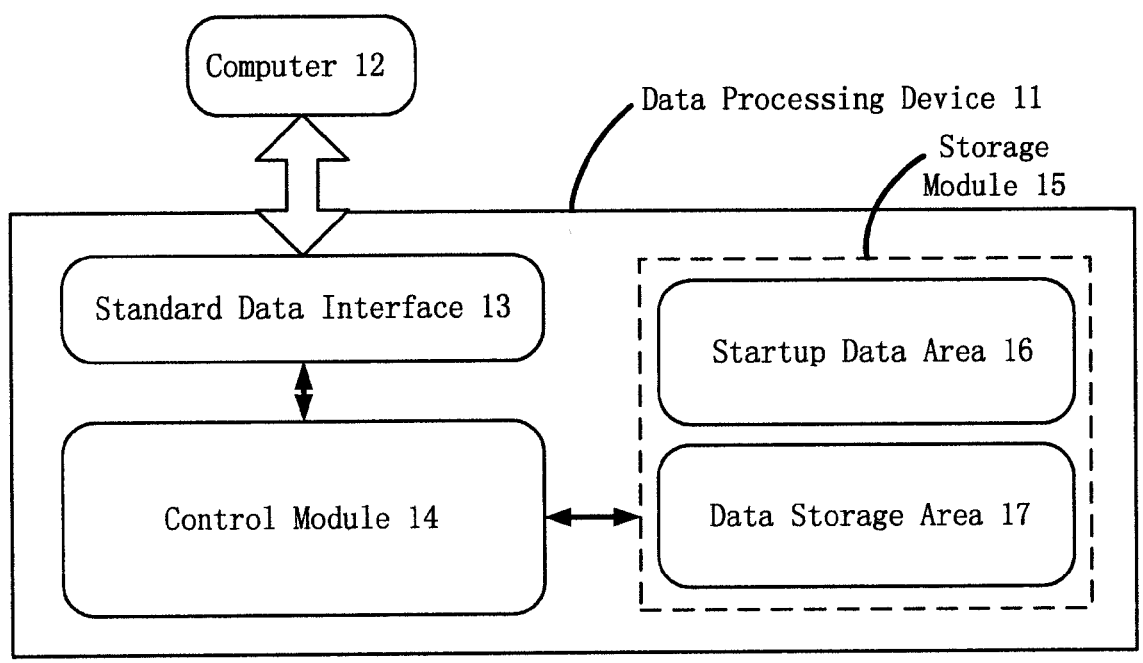
FIG. 1 is an inside schematic view of the data processing device with standard interface adapted to the method of the present invention.

As shown in FIG. 1, the data processing device 11 includes: a standard data interface 13, a control module 14 and a storage module 15, wherein, the standard data interface 13 is performed as an interface for transmitting data between the data processing device 11 and the computer 12, the control module 14 is used for controlling the storage module to achieve data exchanging with the operation system, the storage module 15 is used for storing data.

The standard data interface 13 can be universal serial bus (USB) interface or IEEE1394 interface or CF interface and so on. The control module 14 divides the storage module 15 into N data areas, and maps one of data areas into the device which is capable of auto-running by default of the operation system, furthermore maps the remained N−1 data areas into a plurality of devices of other types.

The storage module 15 includes one or multiple startup data areas 16, for storing the data used for defining the regulation of data exchanging, such as initial data for auto-running and start program etc and common data to be exchanged. In addition, the storage module 15 further includes one or multiple data storage areas 17, in which the data content pointed by data exchanging is stored. The data content may include only the configuration information or the data to be exchanged, or include the configuration information and the data to be exchanged together. Wherein, the configuration information is used to define the position, exchanging order and exchanging pattern of the data to be exchanged in the data storage areas.

In the present invention, the startup data area 16 can be setup as visible area or invisible area to user, or setup as read-only area or R/w area, furthermore setup as the area protected by the security mechanism. The storage data area 17 can be setup as visible area or invisible area to user, or setup as read-only area or R/w area, furthermore setup as the area protected by the security mechanism.

The storage module 15 of the data processing device 11 can use Nand Flash, Nor Flash, electrically erasable programmable read only memory EEPROM and hard disk, etc.

The data processing device incorporates different electronic products, such as USB mobile storage, MP3 player, reader, personal digital assistant (PDA), databank, electronic book (E-book) and electronic phone (E-phone), digital camera and recorder pen, etc. Through the method of the present invention for data processing, during the practical application the above-presented data processing device performs automatically exchanging definable data with the operation system without user's interference.

When the data processing device is connected with the computer under the running-state through the standard data interface, or when the operation system of the computer connected with the data processing device starts, the computer communicates with the control module in accordance with USB or IEEE1394 specification and performs the steps of:

step 1, the computer sending the enquiring message of device's type to the data processing device for inquiring what device's type the data processing device is;

step 2, after receiving the enquiring message of the device's type, the control module sending the device's type message of the data processing device to the computer, and informing the computer that the data processing device is the device with auto-run function or the device without auto-run function. Here, the device with the auto-run function represents the CD driver, in another word, the data processing device pretends itself to be a CD driver to induct the computer to operate the data processing device with the operation process and specification of CD driver. When the computer operates the data processing device in accordance with the operation process and specification of CD driver, the data processing device may realize the function of auto-running the program stored in it for the CD driver's specification is provided with the auto-run function. Contrarily, the device without auto-run function represents the floppy disk, hard disk and flash-based storage device. When the computer operates the data processing device with the corresponding operation process and specification, the data processing device is just a common peripheral storage device of the computer without the auto-run function for the specifications of these devices doesn't have auto-run function.

If the device's type message indicates that the data processing device is the device with auto-run function, then the computer sets the attribute of device's type of the data processing device to the device with auto-run function or the device without auto-run function, such as CD driver. And the data processing device is accessed according to the access specification. During the process of access, if the computer finds that the auto-running file is stored in the data processing device, then the auto-run function is performed according to the script of the auto-running file, else the operation on the data processing device is finished until next access operation to the data processing device.

If the device's type message indicates that the data processing device is the device without auto-run function, then the computer sets the device attribute of the data processing device to corresponding storage device such as floppy disk, hard disk or flash-based storage device and the operation on the data processing device is finished until next access operation to the data processing device.

Sometimes, users don't expect that the computer auto-runs the programs stored in the data processing device, therefore two approaches are provided as following:

One approach is that a control switch is set in the data processing device for controlling the start or stop of auto-run function of the data processing device; on this basis, after receiving the enquiring message of the device's type, the control module checks whether the state of the control switch is representing the start of auto-run function or not, if "yes", then the control module responds the device's type message to the computer and informs the computer that the data processing device is CD driver; else responds the device's type message to the computer and informs the computer that the data processing device is the other device.

Another approach is that a control data is stored in the storage module for representing the start or stop of auto-run function for the data processing device; after receiving the enquiring message of the device's type, the control module firstly accesses the control data, and discriminating whether the data is represented to control the data processing device being the start of the auto-run function; if "yes", then the control module responds the device's type message to the computer and informs the computer that the data processing device is CD driver, else responds the device's type message to the computer and informs the computer that the data processing device is the device but CD driver.

Over here so-called auto-running represents that the computer accesses the programs to be run by the script and executes them in the order specified in the auto-running file and the above technologic content may be referred to the operation specification used in computer of the CD driver according to the script in the auto-running file. The above program may be stored in the storage module of the data processing device or stored in the other storage devices of the computer. Such setting is greatly flexible.

A secure storage area is set in the storage module and is set that the secure storage can not be displayed and/or modified by the computer for securing the auto-running file and program i.e., these auto-running files and program not being deleted or being modified unexpectedly. The auto-running file and/or program may be stored in the secure storage area. In addition, one or a plurality of data storage areas are setup in storage module for storing configuration information and/or data to be exchanged, and storing the configuration information about the data storage areas; therefore, the computer communicates with the data processing device, parses the stored configuration information and exchanges data with the computer in accordance with the configuration information.

The above-presented standard interface may be USB interface or IEEE1394 interface which is widely used now. When the computer connects with the peripheral device by such interface, the computer will sends an enquiring message of device's type to the peripheral device according to the relational standard or specification of the USB or IEEE1394 interface and the peripheral device will respond to the enquiring message to inform the computer what device it is. With receiving such response, the computer will operate the peripheral device in accordance with the device's type taken in the response message.

Figure 2:
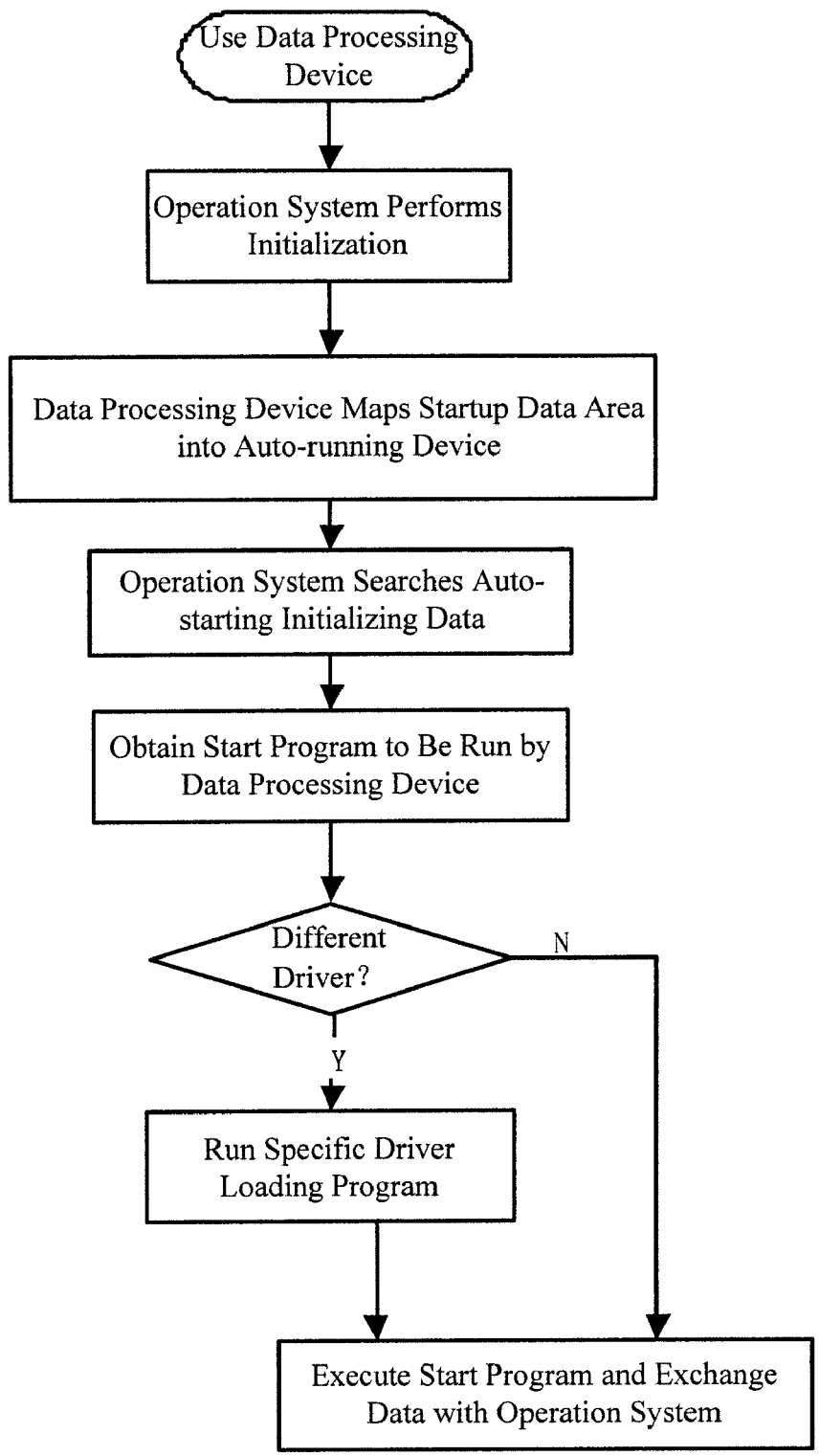
FIG. 2 is a flow chart of an exemplary embodiment of the data processing device shown in FIG. 1 exchanging data with computer.

Refer to FIG. 2, it's a flow chart of another exemplary embodiment of the data exchanging of the present invention.

The data which is required for starting auto-running initializing data in the startup data area and perform data exchanging can be preset. Write the data which is used to define the regulations of data exchanging, including auto-running initializing data, start program, and the data required for implementing data exchanging, into the startup data area of the data processing device. The data required for implementing data exchanging includes the data needed to be exchanged and/or specific driver loading program and so on.

When the data processing device is plug into the computer, the operation system performs necessary initialization of the data processing device in accordance with the type of data interface of the data processing device. The data processing device maps the startup data area into the device with auto-running attribute by default of the operation system, and the operation system searches the startup data area under the pattern of auto-running for the auto-running initializing data to get the start program and running order needed to be run by the data processing device. If the driver needed by the data processing device differs with the standard driver embedded in the operation system, then the specific driver loading program of the startup data area is run. And then the data processing device executes the start program in running order to call the data in the data area and exchange the data with the operation system.

The data storage area is setup in the storage module of the data processing device to store data to be exchanged. In the case, after the start program being executed, the data processing device maps the data storage area into other devices, and then the start program calls the data in the data storage area and exchanges the data with the operation system.

The data storage area of the storage module also may store configuration information which defines the position, exchanging order and exchanging pattern of the data to be exchanged in the data storage area. Here, the data to be exchanged can be stored not only in the startup data area but the data storage area. Under this condition, after the start program is executed, the data processing device maps the data storage area into other type of device such as USB magnanimity storage device etc. Then the start program parses the configuration information in the data storage area and calls the data in accordance with configuration information and exchanges the data with the operation system.

If there's a plurality of startup data areas in the storage module of the data processing device, then the data processing device will map the multiple startup data areas into devices with auto-running attribute by default of multiple operation systems in the same time. Then the operation systems search the startup data areas by turns under the pattern of auto-running for the auto-running initial data and obtain the startup program to be run by the data processing device and running order.

At present, the standard interface include USB interface or IEEE1394 interface, while the devices with auto-running attribute by default of the operation system mainly include CD driver (CDROM) and hard disk etc. Three exemplary embodiments will be provided to describe the application of the present invention.

Exemplary Embodiment 1

The data processing device is a MP3 player with an USB interface which uses Flash as the storage medium and has one startup data area and one data storage area. Wherein the startup data area is a read-write storage area visible to user, so does the data storage area which inherits the intrinsic fundament functions of storage medium. When the MP3 player is connected to the computer, the medium files in storage can be auto-played.

Before practically using the MP3 player, there's supposed to complete ahead: writing the medium files to be played into the data storage area, compiling auto-running initializing file Autorun.ini, setting the start program of auto-play medium files and driver program of the MP3 player, and writing the startup data including modified auto-running initializing file Autorun.ini, the start program of auto-play medium files and driver program of the MP3 player etc into the startup data area.

Figure 3:
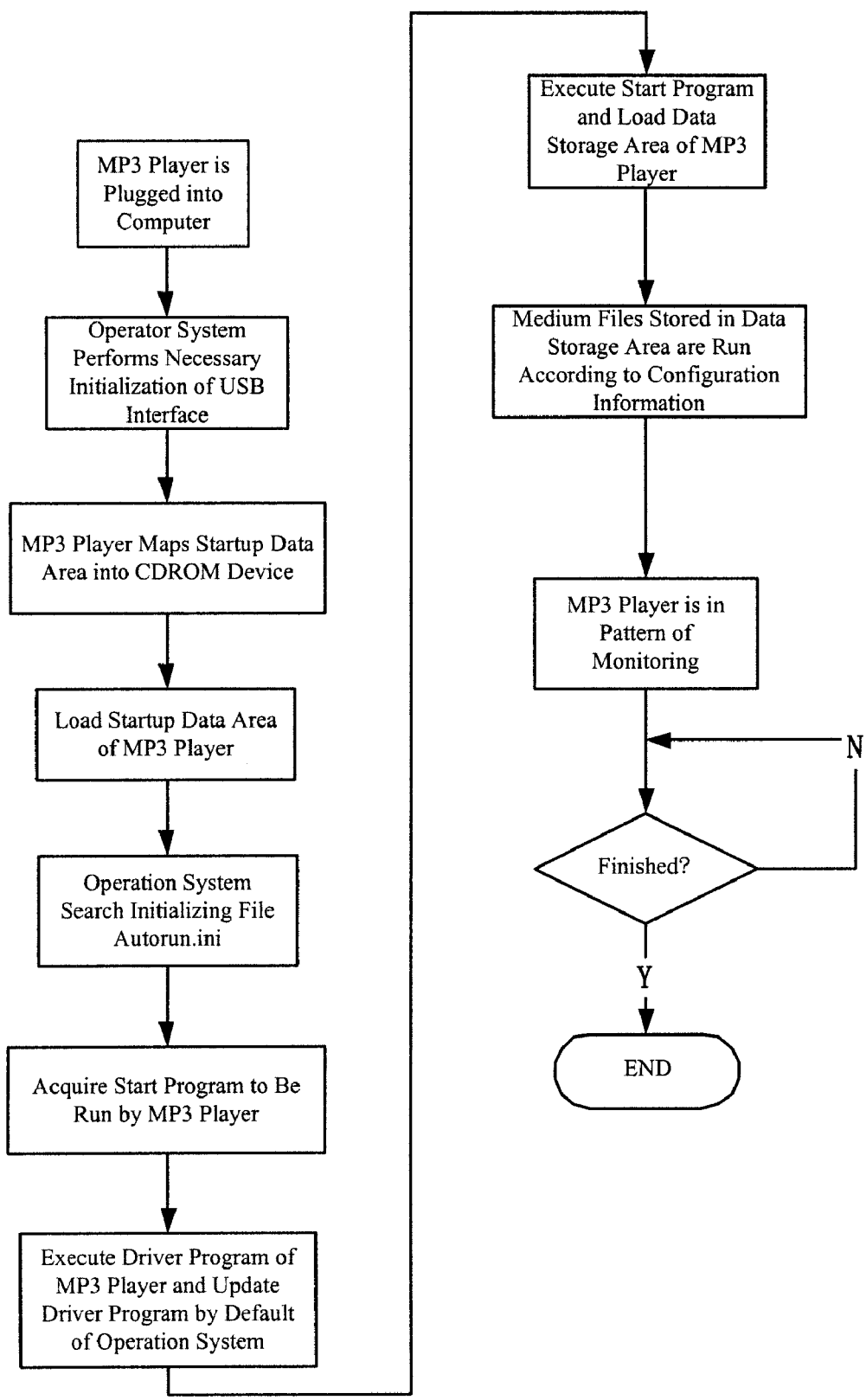
FIG. 3 is a flow chart of exchanging data when the data processing device is a MP3 player appending USB interface.

As shown in FIG. 3, when the MP3 player is plugged into the computer, the operation system performs necessary initialization of USB interface though the embedded driver program of USB interface. After finishing initialization, The MP3 player maps the startup data area into the CDROM device capable of auto-running and loads the startup data area of the MP3 player, and the operation system searches the startup data area under the CDROM pattern for the initializing file Autorun.ini and from which acquires the start program to be run by the MP3 player and the running order. The driver program of the MP3 player differs with the driver program by default of the operation system, thus the driver program in the startup data area is run, and the driver program by default of the operation system is update with the driver program of the MP3 player. While the start program is executed, the data storage area of the MP3 player is loaded and mapped into other types of device. Then the medium files stored in the data storage area are run according to the configuration information and the MP3 player is in the pattern of monitoring until all the operations are stop or the MP3 player is pulled out.

The above-said startup data area and data storage area of the MP3 player are both set as read-write storage area visible to user, thus, user can define the medium files to be played and other matters.

Exemplary Embodiment 2

The data processing device is a Flash card reader with an USB interface. When a Flash card is plugged into the reader, the data stored in the Flash card can be accessed, and then the reader automatically performs data-predefined exchanging with the operation system according to different cards.

Assuming that there are Flash card A and Flash card B, wherein Flash card A has one startup data area which is setup as read-only storage area invisible to user and hasn't data storage area, while Flash card B has One startup data area which is setup as read-only storage area invisible to user and two data storage areas, one of which is read-write storage area invisible to user and the other is read-write storage area visible to user.

The function implemented by the Flash card A is to print the content in the card by printer connected with the computer. While the function implemented by the Flash card B is to synchronize the data stored in secure data storage area of the card with the computer and play designated medium files in the common data storage area.

Before practically using, there's supposed to perform initialization of Flash card A and Flash card B respectively. The initialization of the Flash card A comprises: compiling auto-running initializing file Autorun.ini, setting the start program to be executed, i.e. transmitting the present content of the Flash card A to the computer by infrared interface, printing with installed infrared transmission driver program and printer driver program, and then writing the data including modified initializing file Autorun.ini, infrared transmission driver program, printer driver program and start program into the startup data area. The initialization of the Flash card B comprises: writing the medium files to be auto-played into the common data storage area, compiling the auto-running initializing file Autorun.ini, setting the start program to be executed i.e. synchronizing the data stored in the secure data storage area of Flash card B with the computer and auto-playing the start program of medium file, and then writing the data including modified initializing file Autorun.ini etc into the startup data area.

Figure 4:
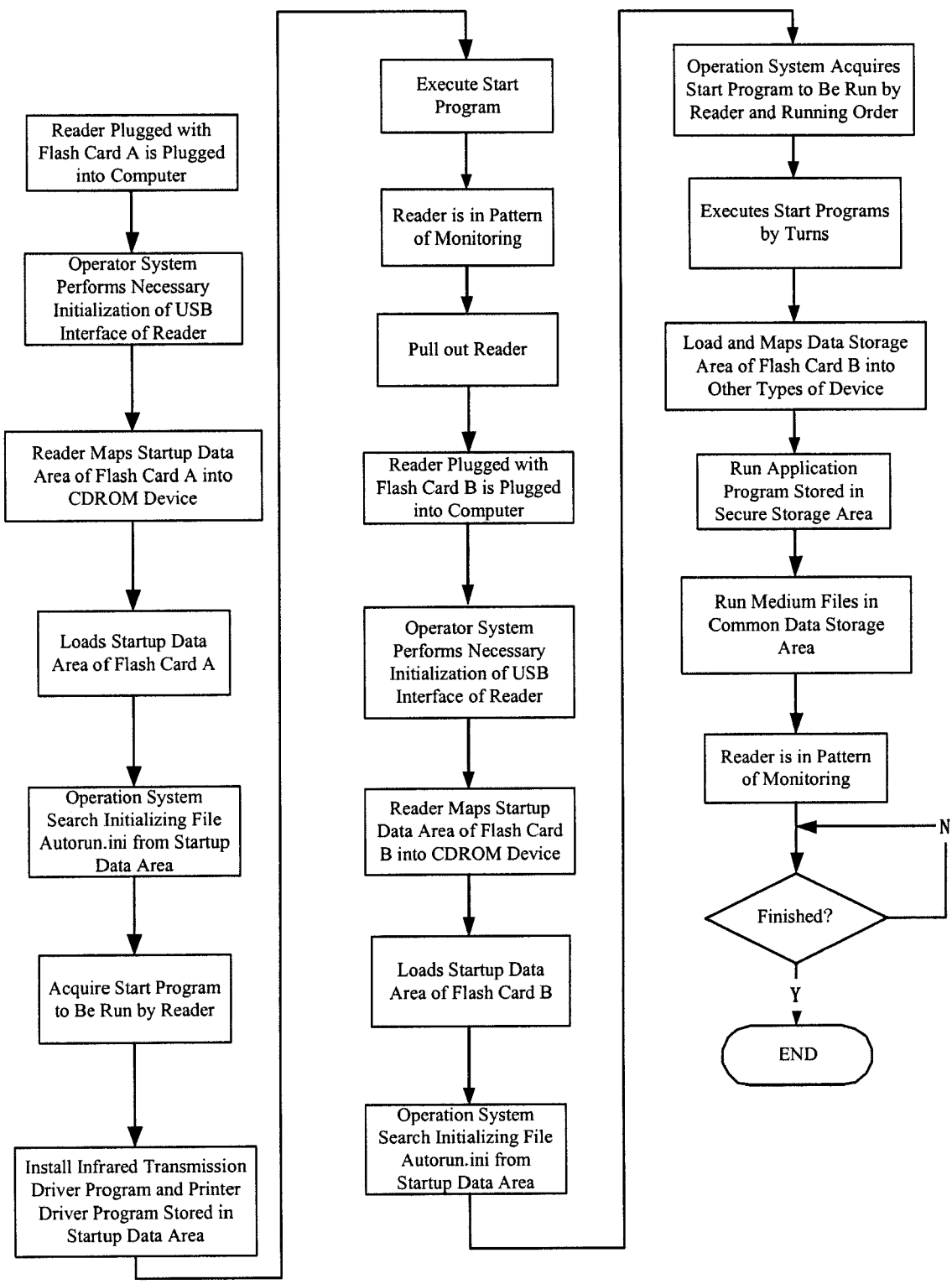
FIG. 4 is a flow chart of exchanging data when the data processing device is a Flash card reader appending USB interface.

Please refer to FIG. 4, when the reader plugged with Flash card A is plugged into the computer, the operation system performs the necessary initialization of USB interface though the embedded driver program of USB interface, and then the reader plugged with Flash card A maps the startup data area of the Flash card A into CDROM device capable of auto-running and loads the startup data area of the Flash card A. The operation system searches the startup data area of Flash card A under the CDROM pattern for the initializing file Autorun.ini, from which acquires the start program to be run by the reader, loads and executes the infrared transmission driver program and printer driver program stored in the startup data area to make the present content of the Flash card A transmitted to the computer by the infrared transmission and printed. And then the reader is in the pattern of monitoring until all the operations are stop or the reader is pulled out.

When the reader plugged with Flash card B is plugged into the computer, the operation system performs the necessary initialization of USB interface though the embedded USB interface driver program. After the initialization finishes, the reader maps the startup data area of the Flash card B into CDROM device capable of auto-running and loads the startup data area of the Flash card B. The operation system searches the startup data area of Flash card B under the CDROM pattern for the initializing file Autorun.ini, from which acquires the start programs to be run by the reader and the running order, executes the start programs by turns, loads and maps the data storage area of the Flash card B into other types of device. And the application program is run to synchronize data with the computer and the medium file in the common data storage area. Then the reader is in the pattern of monitoring until all the operations are stop or the reader is pulled out.

Exemplary Embodiment 3

To realize auto-update. The data processing device is a MP3 player with an USB interface which uses Flash as the storage medium and has one startup data area and one data storage area. Wherein the startup data area is a read-write storage area visible to user, so does the data storage area which inherits the intrinsic fundament functions of storage medium.

When the MP3 player is connected to the computer, the medium files in the MP3 player can be auto-played. At one time, if the computer connects with the internet, the medium files stored in the MP3 player will be auto-updated. Thus, when the MP3 player is connected with the computer again, the updated medium files will be auto-played.

To set the relational data of the MP3 player comprising: compiling the auto-running initializing file Autorun.ini, setting the start program of the auto-playing medium files and the driver program of the MP3 player, writing the data including modified initializing file Autorun.ini, the driver program of the MP3 player and the start program etc into the data startup area, writing the medium files to be auto-played into the data storage area and writing the auto-updated application program into the data storage area.

Figure 5:
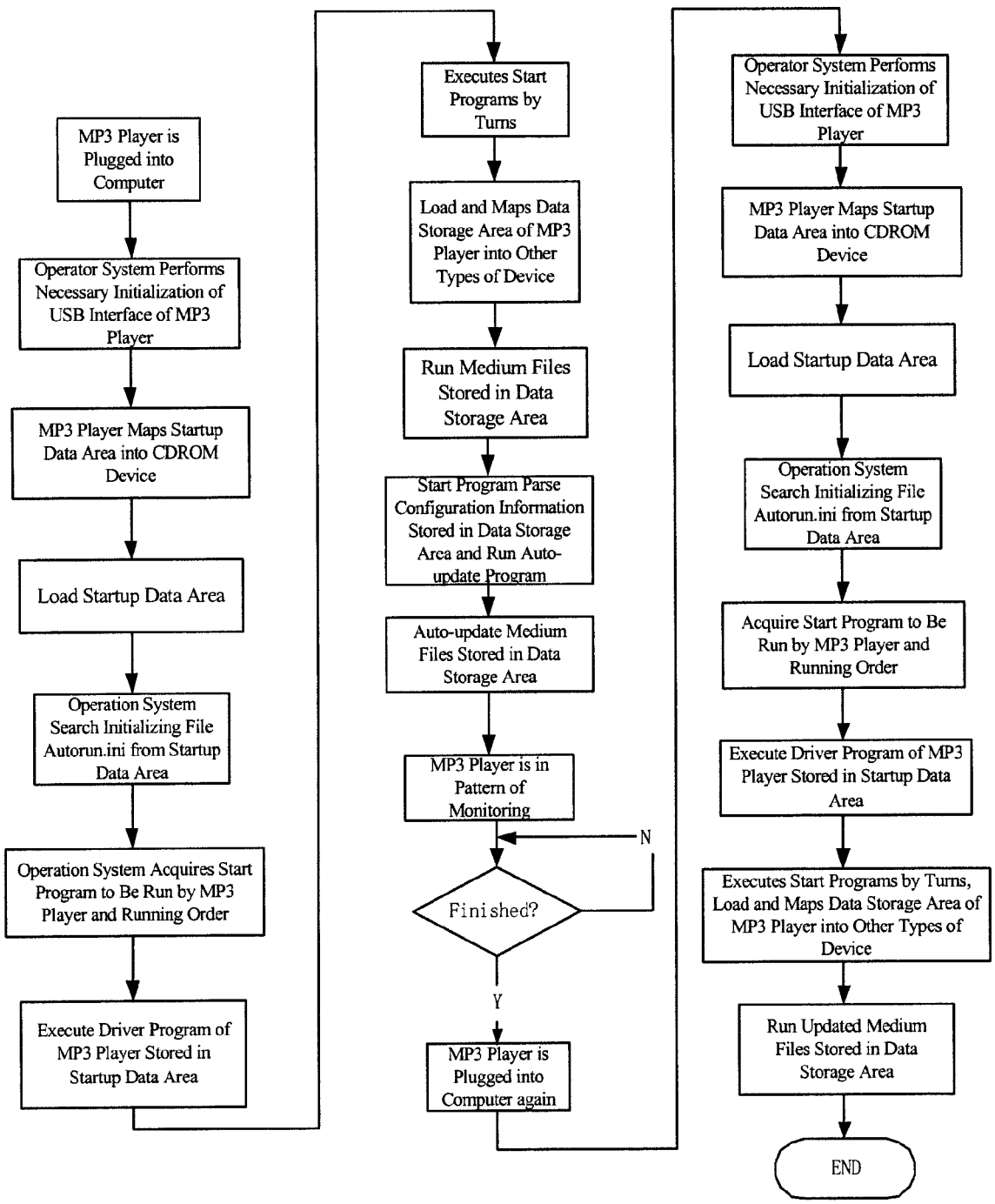
FIG. 5 is a flow chart of automatically update function of a MP3 player produced by the method of the present invention.

As shown in FIG. 5, when the MP3 player is plugged into the computer, the operation system performs necessary initialization of USB interface though the embedded driver program of USB interface. After finishing initialization, the MP3 player maps the startup data area into the CDROM device capable of auto-running and loads the startup data area, and the operation system searches the startup data area under the CDROM pattern for the initializing file Autorun.ini and from which acquires the start program to be run by the MP3 player and the running order. The MP3 player needs specific driver program, thus the driver program of the MP3 player stored in the startup data area is run, and the driver program by default of the operation system is updated with the specific driver program of the MP3 player. The start programs are executed by turns and the data storage area of the MP3 player is loaded and mapped into other types of device. Then the medium files stored in the data storage area are run, the start program parses the configuration information stored in the data storage area and the auto-update program is run to update the medium files stored in the data storage area. The MP3 player is in the pattern of monitoring until all the operations are stop or the MP3 player is pulled out.

When the MP3 player is plugged into the computer again, the operation system performs necessary initialization of USB interface through the embedded driver program of USB interface. After finishing initialization, the MpP3 player maps the startup data area into the CDROM device capable of auto-running and loads the startup data area, and the operation system searches the startup data area under the CDROM pattern for the initializing file Autorun.ini and from which acquires the start program to be run by the MP3 player and the running order. The MP3 player needs specific driver program, thus the driver program of the MP3 player stored in the startup data area is run, and the driver program by default of the operation system is updated with the specific driver program of the MP3 player. The start programs are executed by turns and the data storage area of the MP3 player is loaded and mapped into other types of device. The updated medium files stored in the data storage area are run. Based on the same principle, the present invention also can be used to realize the definable auto-logon, auto-registration application, and so on.

It should be understood that the above embodiments are used only to explain, but not to limit the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A method for a data processing device exchanging data with a computer, said data processing device including a standard data interface, a control module and a storage module; the standard data interface used for connecting the data processing device with the computer, and the control module used for controlling reading and writing from, or to the to storage module and exchanging data with the computer; when said data processing device is connected with the computer under a running-state through the standard data interface or when an operation system of the computer connected with said data processing device starts, said computer communicating with the control module based on said standard data interface, and carrying on the steps of:

step 1, said computer sending an enquiring message of the data processing Device's type to said data processing device;

step 2, after receiving the enquiring message of the data processing device's type, said control module sending a data processing device's type information of said data processing device to the computer, and informing the computer that the data processing device is the data processing device with an auto-run function or without the auto-run function;

step 3, after said computer receiving said data processing device's type information, if the data processing device's type information indicates that the data processing device is the data processing device with the auto-run function, then said computer setting a device attribute of said data processing device to the data processing device with the auto-run function, and accessing said data processing device according to corresponding access specifications, then carrying on step 4, else carrying on step 5;

step 4, if the computer finds an auto-running file stored in the data processing device, then the computer performs the auto-run function according to a script in the auto-running file, else the operation on the data processing device is finished until next access operation to said data processing device;

step 5, said computer setting the device attribute of said data processing device to the data processing device without the auto-run function, finishing the operation on the data processing device until next access operation to said data processing device; wherein said auto-run function concretely specifies that said computer accesses programs to be run by the script according to the script in the auto-naming file and executes them in the order specified in the auto-running file;

said program are stored in the storage module of said data processing device or stored in other storage devices of said computer;

one or a plurality of data storage areas are setup in said storage module for storing configuration information and data to be exchanged, and storing the configuration information about the data storage areas; and said step 5 further comprises: the computer communicating with the data processing device, parsing said stored configuration information and exchanging data with the computer in accordance with the position, exchanging order and exchanging pattern of the data defined by the configuration information; and wherein a plurality of startup data areas are setup in said storage module for storing said auto-running file and one of said programs respectively, and said step 1 to step 5 are executed respectively for each of the startup data areas.

2. The method for a data processing device exchanging data with a computer as claimed in claim 1, wherein a control switch is set in said data processing device for controlling a start or stop of the auto-run function of said data processing device; in said step 2, after receiving the enquiring message of the data processing device's type, the control module checks whether the state of said control switch is representing the start of the auto-run function or not, if "yes", then the control module responds with the data processing device's type message to the computer and informs the computer that the data processing device is the data processing device with the auto-run function, else the control module responds with the data processing device's type message to the computer and informs the computer that the data processing device is the device without the auto-run function.

3. The method for a data processing device exchanging data with a computer as claimed in claim 1, wherein:

a control data is stored in said storage module for representing the start or stop of the auto-run function of said data processing device; in said step 2, after receiving the enquiring message of the data processing device's type, the control module firstly accesses said control data, and discriminates whether the data is represented to control the data processing device being the start of the auto-run function; if "yes", then the control module responds the data processing device's type message to the computer and informs the computer that the data processing device is the data processing device with the auto-run function, else the control module responds with the data processing device's type message to the computer and informs the computer that the data processing device is the data processing device without the auto-run function.

4. The method for a data processing device exchanging data with a computer as claimed in claim 1, wherein a secure storage area is set in said storage module, the secure storage area is set to a state which can not be displayed and/or modified by the computer, said auto-running file and/or one of said programs are stored in the secure storage area.

5. The method for a data processing device exchanging data with a computer as claimed in claim 1, wherein said standard interface of said data processing device is a Universal Serial Bus (USB) interface or IEEE 1394 interface.

6. The method for a data processing device exchanging data with a computer as claimed in claim 1, wherein said data processing device with the auto-run function is a Compact Disk (CD) driver.

7. The method for a data processing device exchanging data with a computer as claimed in claim 1, wherein said data processing device without the auto-run function is a floppy disk, hard disk or flash-based storage device.

* * * * *